(12) United States Patent
Castro Sotelo et al.

(10) Patent No.: US 9,120,885 B2
(45) Date of Patent: Sep. 1, 2015

(54) FORMULATIONS OF RANDOM POLYMERS FOR IMPROVING CRUDE PETROLEUM FLOW

(75) Inventors: Laura Veronica Castro Sotelo, Mexico City (MX); Eugenio Alejandro Flores Oropeza, Mexico City (MX); Gabriel Cendejas Santana, Mexico City (MX); Marcelo Lozada Y Cassou, Mexico City (MX); Flavio Salvador Vazquez Moreno, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 849 days.

(21) Appl. No.: 12/886,974

(22) Filed: Sep. 21, 2010

(65) Prior Publication Data

US 2011/0067295 A1    Mar. 24, 2011

(30) Foreign Application Priority Data

Sep. 22, 2009  (MX) .................... MX/a/2009/010135

(51) Int. Cl.
*C10L 1/18* (2006.01)
*C08F 218/08* (2006.01)
*C10L 1/14* (2006.01)
*C10L 10/16* (2006.01)
*C08F 212/08* (2006.01)
*C09K 8/524* (2006.01)
(Continued)

(52) U.S. Cl.
CPC ............ *C08F 218/08* (2013.01); *C08F 212/08* (2013.01); *C09K 8/524* (2013.01); *C10L 1/143* (2013.01); *C10L 10/16* (2013.01); *C08F 2220/1825* (2013.01); *C10L 1/1608* (2013.01); *C10L 1/1616* (2013.01); *C10L 1/1973* (2013.01); *C10L 1/201* (2013.01); *C10L 1/2362* (2013.01); *C10L 2230/14* (2013.01)

(58) Field of Classification Search
CPC ...... C10L 1/143; C10L 1/1963; C10L 1/1973
USPC ........................................................... 44/393
See application file for complete search history.

(56) References Cited

U.S. PATENT DOCUMENTS 3,337,649 A * 8/1967 Black et al. .................... 522/116
3,841,850 A * 10/1974 Aaron et al. ................... 44/393

(Continued)

FOREIGN PATENT DOCUMENTS

| CA | 2548008 | 6/2005 |
| EP | 0136698 | 4/1985 |
| EP | 0931825 | 7/1999 |

OTHER PUBLICATIONS

Soni et al., Synthesis and Evaluation of Polymeric Additives as Flow Improvers for Indian Crude Oil, Iranian Polymer Journal 15 (12), 2006, 943-954.

(Continued)

*Primary Examiner* — James Goloboy
*Assistant Examiner* — Ming Cheung Po
(74) *Attorney, Agent, or Firm* — Roylance, Abrams, Berdo & Goodman, L.L.P.

(57) ABSTRACT

The present invention is related to the use of formulations of new random copolymers and terpolymers, synthesized by a method of semi continuous emulsion polymerization, and that function as flow improvers, lowering the pour point and reducing the viscosity of Mexicans crude oils, which have gravities within the range of 9 to 30° API.

31 Claims, 6 Drawing Sheets

(51) Int. Cl.
  *C10L 1/16*   (2006.01)
  *C10L 1/197*  (2006.01)
  *C10L 1/20*   (2006.01)
  *C10L 1/236*  (2006.01)
  *C08F 220/18*  (2006.01)

(56) References Cited

U.S. PATENT DOCUMENTS

| | | | | |
|---|---|---|---|---|
| 4,142,865 | A | * | 3/1979 | Broeckx et al. .............. 44/459 |
| 4,160,459 | A | * | 7/1979 | Sweeney .................... 137/13 |
| 4,362,533 | A | * | 12/1982 | Kidd .......................... 44/396 |
| 5,721,201 | A | | 2/1998 | Tomassen et al. |
| 6,569,961 | B1 | | 5/2003 | Adams |
| 2004/0092665 | A1 | | 5/2004 | Pazur et al. |
| 2007/0094920 | A1 | | 5/2007 | Ahlers et al. |

OTHER PUBLICATIONS

Borthakur et al., Alkyl Fumarate-Vinyl Acetate Copolymer as Flow Improver for High Waxy Indian Crude Oils, Energy & Fuels 1996, 10, 844-848.
Camacho-Bragado et al., Fullerenic Structures Derived from Oil Asphaltenes, Carbon 40 (2002) 2761-2766.
Castro et al., Copolymers as Flow Improvers for Mexican Crude Oils, Energy & Fuels 2008, 22, 4006-4011.
Castro et al., Fractionation and Characterization of Mexican Crude Oils, Energy & Fuels 2009, 23, 1603-1609.
Jimenez-Angeles et al., Population Inversion of a NAHS Mixture Adsorbed into a Cylindrical Pore, J. Phys. Chem. C 2008, 112, 18028-18033.
Nunez Santiago et al., Introduccion a la Reologia, Instituto Politecnico Nacional, 2001.
Odriozola et al., Entropy Driven Key-Lock Assembly, The Journal of Chemical Physics 129, 111101 (2008).
Reyes-Mercado et al., Effect of the Acrylic Acid Content on the Permeability and Water Uptake of Poly(Styrene-Co-Butyl Acrylate) Latex Films, Colloid Polym Sci (2008) 286:603-609.
Ronningsen et al., Wax Precipitation from North Sea Crude Oils: 1. Crystallization and Dissolution Temperatures, and Newtonian and Non-Newtonian Flow Properties, Energy & Fuels 1991, 5, 895-908.
Torres et al., Effect of Composition on the Solution Rheology of Stearyl Methacrylate-co-Styrene-co-Vinyl Pyrrolidinone in Paraffinic Base Oil, Polymer Engineering and Science; Apr. 2004; 44, 4; ProQuest Science Journals p. 736.

* cited by examiner

FORMULATIONS OF RANDOM POLYMERS FOR IMPROVING CRUDE PETROLEUM FLOW

CROSS-REFERENCE TO RELATED APPLICATION

This application claims the benefit under 35 U.S.C. §119 of Mexican Patent Application No. MX/a/2009/010135, filed Sep. 22, 2009, which is hereby incorporated by reference in its entirety.

FIELD OF INVENTION

This invention is related to the synthesis of random polymers, their formulation and application as flow improvers of crude petroleum with API densities between 9 and 30° API. These flow improvers decrease petroleum pour point and viscosity.

The random polymers considered in this invention were synthesized by semi continuous emulsion polymerization causing the reaction of two or three commercial monomers and were added as a formulation in Mexican crude oils at concentrations between 250 and 4,000 parts per million.

BACKGROUND OF THE INVENTION

Crude oil and any of their distillates, such as diesel, gasoil, naphtha and kerosene, contain different percentages of paraffins, which precipitate when the temperature decreases and crystallize very often coating the hydrocarbon.

The crystallization and agglomeration of paraffins degrade the flow properties of the oil or their distillates and break off the extraction procedure, processing, transport, storage and the use of the hydrocarbon.

This paraffin agglomeration is often observed during winter, when the environmental temperature falls and approaches to the pour point, producing the obstruction and even the complete plugging of pipelines in refineries, storage centers and other installations for petroleum processing.

Paraffin agglomeration takes place also in some crude distillates, in example diesel, producing obstructions in the filters of internal combustion motors, plugging heating pipes, which results in a bad operation.

When there is a cooling, paraffins disaggregate and form small crystals which interact forming a tridimensional network able to trap the liquid and increasing the viscosity. If this one happens in distillates like diesel, filter and valve stoppages are observed, but, when this phenomenon occurs in crude oil, the petroleum suffers gelling and deposits are formed on pipelines and storage tanks, provoking great damages to the production and storage capacity.

There are two kinds of flow improvers: nucleation and Crystal growing modifiers (Odriozola et al, 2008). The first promote the formation of tiny paraffin crystals, whereas the second kind facilitates the appearance of great crystal groups. In both cases the formation of a tridimensional crystal network is hindered. Nucleation modifiers are applied in gas and diesel transport and processing because paraffin crystals are so tiny that they can traverse trough filters. In contrast, growing modifiers are specially employed in crude oils (Tomassen H P M et al, 1998).

Most common flow modifiers are polymers, some of them homopolymers and the most copolymers. Homopolymers are obtained by reacting a single monomer while copolymers are synthesized from a combination of two different copolymers (M1 and M2). Monomers forming a copolymer chain may be arranged following an alternate sequence (alternate copolymer $M_1M_2M_1M_2M_1M_2$), or a succession of first monomers followed by a succession of the second monomer (block copolymers $M_1$ $M_1$ $M_1$ $M_1$ $M_2$ $M_2$ $M_2$ $M_2$) or a random sequence of monomers ($M_1$ $M_2$ $M_1$ $M_1$ $M_2$ $M_2$ $M_2$ $M_1$). This last kind of copolymers is specially characterized by their high homogeneous composition. The monomer sequence arrangement in copolymer chains, just that composition homogeneity, has a strong influence on their application properties. The use of single terpolymers as petroleum flow improvers has not yet been reported.

In the specific case of polymers employed as petroleum flow improvers, branched polyolefins, alphaolefin and esters of unsaturated carboxylic acids copolymers, ethylene and vinyl esters of fat acid copolymers, vinyl acetate and alpha olefin copolymers, styrene maleic anhydride copolymers, fatty acid amides and polyalkylacrylates, (Castro L V et al, 2008).

More specifically, ethylene-vinyl acetate copolymers (EVA) are produced by BASF under the trade mark Keroflux (Eisenbeis A et al., 2005).

Some examples of petroleum flow improvers given by the international literature are the following: European Patent No. EP0931825 B1 depicts a process for improving flow properties of oils with a sulfur content lower than 500 ppm and a minimal paraffin content around 8% by weight, using mixtures of copolymers and terpolymers, at a rate of 15% to 50% by weight of copolymers consisting of: polyethylene from 87% to 92% mol; polyvinyl acetate from 6.5% to 12% mol and 4-methyl-polypentene from 0.5% to 6% mol and terpolymers made of ethylene, vinyl esters and vinyl acrylates, at a composition between 50 and 85% (Krull M et al, 2003).

U.S. Pat. No. 4,362,533 describes the synthesis and use of terpolymers as pour point depressors for crude oil middle distillates, made of polyethylene (45-75% wt.), at least 5% by weight of polyvinyl acetate and 5% by weight of polystyrene. These polymers present a homogeneous distribution and composition of each monomer (Kidd, N. A., 1982).

European Patent No. 0136698A2 describes as a new flow improver a polymer with content between 50 and 90% by weight of ethylene, 10 to 40% by weight of esters of polyvinyl, 0.2 to 10% by weight of olefins and 2% to 25% by weight of aromatic vinyl, its molecular mass vary from 1,000 to 50,000, more preferably 2,000 to 10,000 Dalton. The polymer is added at concentrations between 0.03 and 0.10% by weight, being very effective to decrease the pour point of oils and middle distillates of petroleum (Chen J C S, 1985).

U.S. Patent Publication No. 2004/0092665 describes the use of copolymers constituted by a butylic fraction (isoprene, butadiene, 2,4-dimethyl-butadiene, 2,4-hexadiene and halogenated derivatives, among others) and styrenic fraction (alpha-methyl-styrene and styrene) (Pazur R et al, 2004).

Copolymer synthesized from vinyl esters, alkyl acrylate and styrene were added (200 to 4,000 ppm) into Mexican crude oils and diminished viscosity and pour point (Castro L V et al, 2008). These additives were synthesized by semi continuous emulsion polymerization and, afterwards, characterized by spectroscopic and calorimetric techniques, in order to ensure a random distribution in the chains and a homogeneous composition. The synthesis procedure showed their efficiency to avoid the formation of homopolymer mixtures. The performance of these products depends strongly on this molecular feature and on the absence of long sequences of a single monomer.

In Mexico, the reserves of light crude oil diminishes very fast and, in consequence, only heavy and extra-heavy crude oils will be processed in the future by the national system of refineries. This situation represents a challenge because of the technical and economical difficulties related to this problem. Therefore, it is very important to find a solution to the problem of the low API gravity and high viscosity of the Mexican crude oils (Camacho-Bragado et al, 2002).

Taking in account the great importance of these technical and economical requirements, a series of formulations of new random copolymers and terpolymers dissolved in different solvents was prepared. All these polymers were prepared by emulsion polymerization and showed a considerable performance as pour point and viscosity decrease agents in some Mexican crude oils. It is important to remark that none of the references mentioned above neither disclose nor claim the application of polymers and/or formulations whose main characteristic is that polymers are composed of combinations of two or three acrylic, vinylic and styrenic monomers together at random which main component are styrenic type.

BIBLIOGRAPHIC REFERENCES

Ahlers W. et al. U.S. Patent Publication No. 2007/0094920 (2007).

Bharambe Dinakar P. and Soni Hemant P. Synthesis and Evaluation of Polymeric Additives as Flow Improvers for Indian Crude Oil. *Iranian Polymer Journal* 15 943-954 (2006).

Borthakur A., Chanda D., Dutta Choudhury S. R., Alkyl fumarate-vinyl acetate copolymer as flow improver for high wxy Indian crude oils. *Energy & Fuels* 10 844-848 (1996).

Camacho-Bragado G. A., Santiago P, Marin-Almazo M, Espinoza M, Romero E. T., Murgich J, Rodríguez-Lugo V, Lozada-Cassou M and Jose-Yacaman M, Fullerenic structures derived from oil asphaltenes. *Carbon* 40 2761-2766 (2002).

Castro L V and Vazquez F. Copolymers as flow improvers for Mexican crude oils. *Energy and Fuel.* 22 4006-4011 (2008).

Castro Laura V. and Vazquez Flavio, Fractionation and characterization of Mexican Crude oils. *Energy and Fuels.* 23 1603-1609 (2009).

Charles Adams, Emulsion Polymerization process and reactor for such a process. U.S. Pat. No. 6,569,961 B1. (2003).

Chen J C S. Cold flow improver. EP0136698 (1985).

Eisenbeis A, Ahlers W, Troetsch-Schaller I, Fechtenkoetter A and Maehling F O. Fuel oil compositions with improved cold flow properties. CA 2 548 008 A1 (2005).

Jimenez-Angeles F, Duda Y, Odriozola G, and Lozada-Cassou M. Population inversion of a NAHS Mixture Absorbed into a cylindrical pore. *J. Phys. Chem. C.* 112 18028-18033 (2008).

Kidd, N. A. Terpolymer of ethylene, vinyl acetate, and styrene as pour point depressants for distillate fuel U.S. Pat. No. 4,362,533 (1982).

Krull M and Reimann W. Process and product to improve cold flow properties of fuel oils. EP 0931825 B1 (2003).

Nuñez S. Ma. Del Carmen. *Introducción a la reología*, D. R. Instituto Politécnico Nacional, 2001.

Odriozola G, Jimenez-Angeles F and Lozada-Cassou M, Entropy driven key-lock assembly. *J. Chem. Phys.* 129 101-111 (2008).

Pazur R and Sumner A J. Butyl polymer composition having improved cold flow properties U.S. Patent Publication No. 2004/0092665 (2004).

Reyes-Mercado Y., Vazquez F., Rodriguez-Gomez F. J., Duda Y. Effect of the acrylic acid content on the permeability and water uptake of poly(styrene-co-butyl acrylate) latex films. *Colloid Polym Sci.* 286 603-609 (2008).

Ronningsen Hans Petter and BjØrndal. Wax precipitation from North Sea crude oils: 1. Crystallization and dissolution temperatures, and Newtonian and non-newtonian flow properties. *Energy & Fuels* 5 895-908 (1991).

Tomassen H P M, Van de K C C, Reynhout M J and Lin J. Polymeric flow improver additives U.S. Pat. No. 5,721,201 (1998).

Torres E, Dutta N, Roy C. N. and Matisons J. Effect of composition on the solution rheology of Stearyl Methacrylate-co-styrene-co-vinyl pyrrolidinone in paraffinic base oil. *Polymer Engin. Sci.* 44 736-748 (2004).

BRIEF DESCRIPTION OF THE DRAWINGS

The following figures are given in order to understand clearly the performance of the formulation of random polymers for improving crude petroleum flow and are used as reference of the application examples.

DETAILED DESCRIPTION OF THE INVENTION

Figure 1:
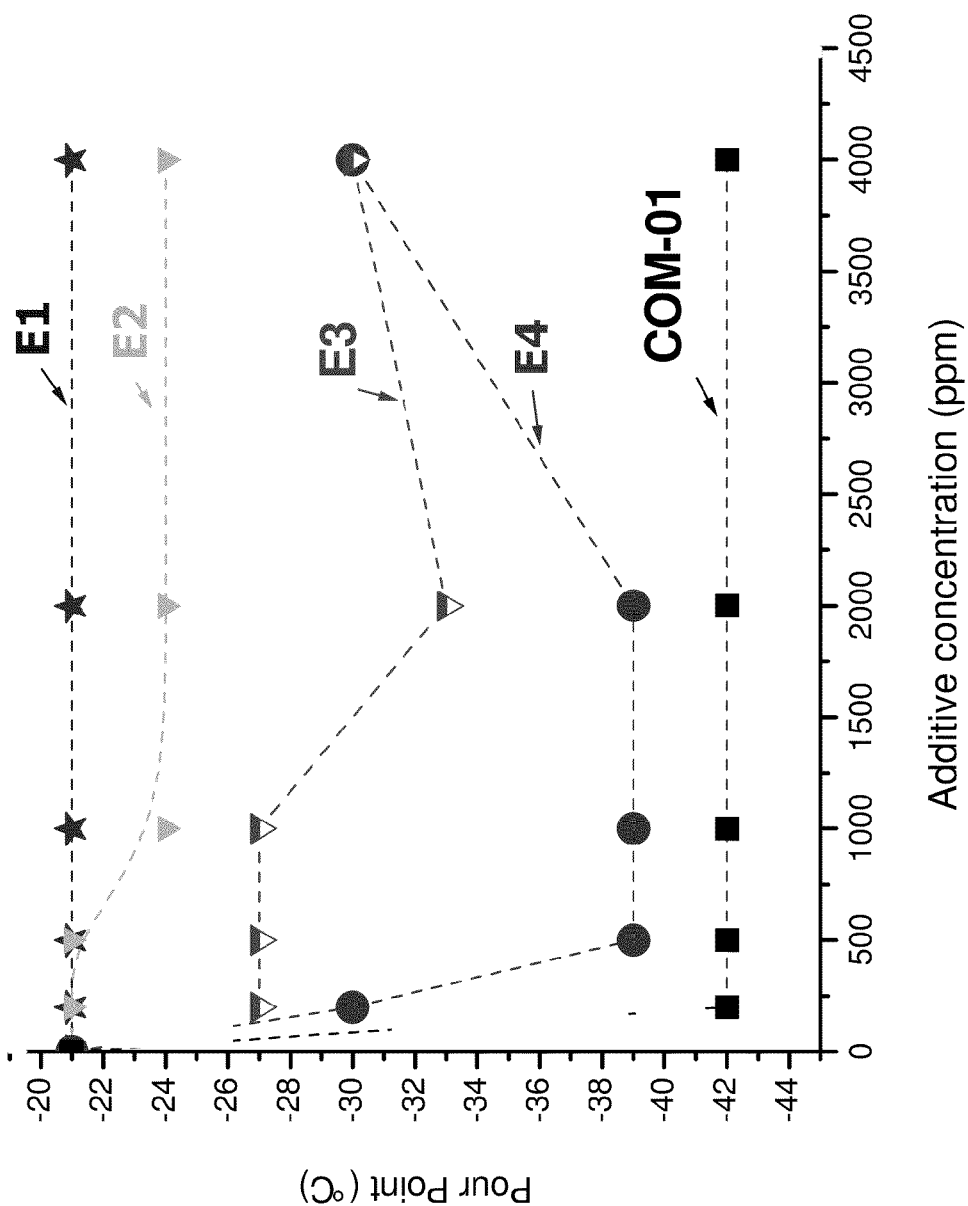
FIG. 1 shows the effect of the pour point decrease activity in light crude oil of examples E1-E4, evaluated between 200 and 4,000 ppm, and compared to the commercial product COM-01.

The present invention consists of the synthesis of new random copolymers and terpolymers by semicontinuous emulsion polymerization and the preparation of formulations (random copolymers and terpolymers combined with organic solvents) and their application as flow improvers and viscosity reducers. The invention is also directed to a process of reducing the viscosity and depressing the pour point of crude oil by mixing the crude oil with an effective amount of the random copolymers and terpolymers to reduce the viscosity and depress the pour point. In schemes 1 to 3 the copolymer structure (random combination of a couple of monomers) are shown and in scheme 4 the terpolymer structure obtained from three monomers combination are shown:

Copolymers

Scheme 1

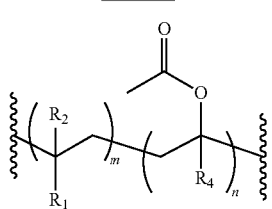

Scheme 2

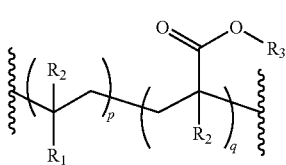

Scheme 3

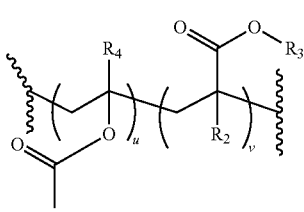

Terpolymers

Scheme 4

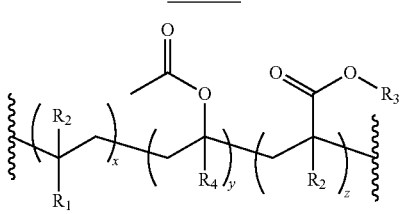

where:
$R_1$, $R_2$, $R_3$ and $R_4$ are represented by independent radical groups listed below:
$R_1=C_6H_5$, $CH_3C_6H_4$, $(CH_3)_2C_6H_3$, $(CH_3)_3C_6H_2$, $(CH_3)_3CC_6H_4$;
$R_2=H, CH_3$;
$R_3=CH_3$, $C_2H_5$, $C_4H_9$, $C_6H_{13}$, $C_8H_{17}$, $C_{10}H_{21}$, $C_{12}H_{25}$, $C_{18}H_{37}$;
$R_4=H, CN$.
and where:
x, y, z, m, n, p, q, u and v are numbers within the following ranges:

x=from 2 to 900, preferably from 20 to 850, even more preferably from 25 to 700;
z=from 1 to 300, preferably from 10 to 235, still more preferably from 20 to 220;
y=from 1 to 226, preferably from 10 to 210, still more preferably from 20 to 200;
m=from 10 to 700, preferably from 20 to 650, still more preferably from 40 to 620;
n=from 1 to 220, preferably from 10 to 200, still more preferably from 20 to 170;
p=from 1 to 700, preferably from 25 to 650, still more preferably from 60 to 620;
q=from 1 to 50, preferably from 5 to 45, even more preferably from 10 to 40;
u=from 1 to 220, preferably from 10 to 200, more preferably from 30 to 170;
v=from 1 to 50, preferably from 10 to 40, more preferably from 15 to 30.

Additionally, the molecular weights are in the following ranges, from 1,000 to 100,000 Daltons, preferably between 5,000 and 90,000 Daltons for the case of copolymers and from 1,000 to 140,000, preferably from 2,000 to 100,000 Daltons in the case of random terpolymers.

The copolymers and terpolymers of the present invention are prepared by emulsion polymerization technique, which presents ecological advantages when using water as dispersion medium avoiding the use of large amounts of organic solvents during the synthesis stage. Emulsion polymerization is widely used for the synthesis of adhesives, paints and varnishes, but has not reported used as improvers in crudes oil (Charles Ad 2003).

The following describes by way of example, it does not imply any limitation, the monomers used in the synthesis of polymers object of this invention: methyl acrylate, tert-butyl methacrylate, butyl acrylate, butyl methacrylate, hexyl acrylate, hexyl methacrylate, iso-butyl acrylate, iso-butyl methacrylate, ethyl acrylate, ethyl methacrylate, tert-butyl acrylate, 3,5,5-trimethyl-hexyl acrylate, iso-decyl acrylate, iso-decyl methacrylate, iso-octyl acrylate, lauryl acrylate, lauryl methacrylate, octadecyl acrylate, 2-ethyl-hexyl acrylate, 2-ethyl-hexyl methacrylate, styrene, 2,4,6-trimethyl-styrene, 2,4-dimethyl-styrene, 3-methyl-styrene, 4-methyl-styrene, 2-methyl-styrene, 4-tert-butyl-styrene, α,2-dimethyl-styrene, α-methyl-styrene, methyl styrene, vinyl acetate, and cyanovinyl acetate.

The synthesis of polymers (random copolymers and terpolymers) of the present invention, which are effective in the lowering of the pour point and viscosity reduction of light, median and mainly heavy crudes oil, comprising seven stages:
1) Preparation of the initiator.
2) Preparation of surfactant solutions ((Anionic(A) and/or nonionic (B))
3) Preparation of buffer solution
4) Preparation of the monomers (combination of two monomers for copolymers and three monomers for terpolymers)
5) Preparation of Cuba or foot main reactor.
6) Preparation tank addition.
7) Polymerization of combinations of two or three monomers.

The synthesis of polymers using the semicontinuous method was used (Reyes-Mercado Y. et al.) which is described below. This method is illustrative but not limiting:
1) Initiator preparation: In a balloon flask equipped with magnetic stirring, is placed a suitable amount of initiator, and dissolved in deionized water and kept stirring for 10 minutes. These amounts can vary between 0.5 and 15.0 g of initiator per 100.0 g of deionized water. As initiators, potassium, sodium or ammonium persulfates, as well as sodium or potassium methabisulfite and benzoyl hydroperoxide can be used.

2) Preparation of surfactant solutions. In a flask equipped with magnetic stirring, are placed an appropriate amount of surfactant A (ionic) and surfactant B (nonionic), both are dissolved in deionized water and kept stirring for 40 minutes. These amounts can vary between 0.5 and 50.0 g of surfactant per 100.0 g of deionized water.

3) Preparation of buffer solution. The buffer ensures no abrupt changes in the pH of the system. In a balloon flask equipped with magnetic stirring ball, is placed an appropriate amount of buffer, (for example sodium or potassium bicarbonate) dissolved in deionized water and kept stirring for 10 minutes. These amounts can vary between 0.5 and 15.0 g of initiator per 100.0 g of deionized water.

4) Preparation of the monomers. In a volumetric flask, is placed the appropriate amount of monomer or monomers required (two monomers for copolymers and three monomers for terpolymers). The compositions of each monomer in the mixture can vary between 1% and 99%, preferably between 5% and 90% compared to total monomer. It requires a transfer agent (for example dodecyl or terdodecyl mercaptane) to control the molecular weights of polymers. The transfer agent is added to the mixture of monomers. The amount of transfer agent can vary between 0.0 and 12.0 g per 100.0 g of monomer, according to the desired molecular weight. This mixture is stirred for about 5 minutes.

5) Preparation of cuba or foot main reactor: The reactions were conducted in a glass reactor of one liter capacity with a heating jacket through which water is recirculated at constant temperature. Agitation is achieved by a propeller of two sheets of Teflon-coated material, moved by a mechanical stirrer of varying acceleration. The reactor also has a condensation system, with connections for temperature monitoring, connection for inert gas injection and sampling connection. The reactor is filled with a solution of appropriate amounts of surfactant A and surfactant B, buffer solution, deionized water and a small amount of mixture of monomers. These amounts can vary between 1.0 and 25.0 g of solution per 100.0 g of monomers. Deionized water is added, which can vary between 70 and 300 g. Subsequently, the reactor is pressurized with nitrogen to ensure inert atmosphere. The temperature was set between 50 and 90° C. to ensure the smooth progress of polymerization. After 10 to 40 minutes of stirring, is added the appropriate amount of initiator solution. This amount can vary between 1.0 and 20.0 g of initiator solution. Again, the reactor is pressurized with nitrogen to ensure polymerization.

6) Preparation tank addition. The addition tank was carried out in a glass flask of one liter capacity with connection to suction of dosing pump and with controlled magnetic stirring. Once the preparation of the foot of cuba proceed to slowly add the remaining monomer mixture, solutions of surfactant A, B and the remaining buffer in addition to the tank. Finally, deionized water is added, which can vary between 70.0 and 300.0 g per 100.0 g of monomers.

7) Copolymerization or terpolymerization of monomers. It connects the addition tank to the main reactor (foot of cuba), through a metering pump. The ratio of feed addition tank ranges from 0.003 to 0.009 g/mL-min, more preferably 0.004 to 0.007 g/mL-min. This rate of addition guarantees the existence of monomer deficiency in the main reactor and ensures that the pairs or trios of monomers react with each other and respectively forming random copolymers or terpolymers. Do not place the addition in the range of speeds of addition, as this will form large sequences of a single monomer within the chains and even form mixtures of homopolymers.

To obtain the desired molecular weight after the addition of the monomers, it is necessary to complete the reaction by adding small amounts of initiator and increasing the temperature to 90 and 95° C. for one hour. The copolymer or terpolymer was subsequently placed in sealed containers. Random copolymer or terpolymer reactions achieve conversions between 98.00-99.99% by weight (Castro L V et al, 2008). The products obtained have latex form. The dispersion of latex in water is easier to process and avoids the use of organic solvents, without health and the environment risks. Stressing further that without this synthesis procedure, it is virtually impossible to obtain the random polymers (copolymers and terpolymers).

Once obtained copolymers and terpolymers were characterized using the instrumental methods:

1.—Infrared brand model Thermo Nicolet® AVATAR 330 Spectrometer Fourier Transform using the method of film technique with software version 7.0 OMNIC®.
2.—Nuclear Magnetic Resonance Jeol Eclipse equipment, operating at 300 MHz and 75 MHz for $^1$H and $^{13}$C spectra respectively, using deuterated chloroform as solvent; the shifts are indicated in parts per million, about tetramethylsilane (TMS) signal, as internal standard.
3.—Size exclusion chromatograph Agilent® model 1100 (CET), with PLgel column and using tetrahydrofuran (THF) as eluent, to calculate the molecular distribution of copolymers and terpolymers and the polydispersity index (I).

Molecular masses, polydispersity indices and spectroscopic characteristics are now described in Tables 1 and 2, which does not mean limitation:

TABLE 1

Copolymers number molecular masses (Mn) and polydispersity index (I) measured by (CET).

| Copolymers | Mn (g/mol) | Polydispersity Index I | Physical State |
| --- | --- | --- | --- |
| E-1 | 2938 | 1.4 | Viscous semi solid |
| E-2 | 2213 | 1.2 | Viscous semi solid |
| E-3 | 9279 | 2.1 | Viscous semi solid |
| E-4 | 1691 | 1.5 | Viscous semi solid |
| E-5 | 55278 | 2.8 | Viscous semi solid |

TABLE 2

Terpolymers number molecular masses (Mn) and polydispersity index (I) measured by (CET).

| Terpolymers | Mn (g/mol) | Polydispersity Index I | Physical state |
| --- | --- | --- | --- |
| E-6 | 1448 | 1.9 | Viscous semi solid |
| E-7 | 1109 | 3.3 | Viscous semi solid |
| E-8 | 139900 | 2.3 | Viscous semi solid |
| E-9 | 2057 | 1.8 | Viscous semi solid |
| E-10 | 23488 | 1.7 | Viscous semi solid |
| E-11 | 2223 | 3.3 | Viscous semi solid |
| E-12 | 21547 | 2.1 | Viscous semi solid |
| E-13 | 2954 | 1.7 | Viscous semi solid |
| E-14 | 20701 | 1.9 | Viscous semi solid |
| E-15 | 1184 | 2.0 | Viscous semi solid |
| E-16 | 6816 | 2.7 | Viscous semi solid |

EXAMPLES

The following examples are presented to illustrate the best mode of random polymer synthesis, formulation and implementation as flow improvers in crudes oil with API gravities ranging from 9 to 30. These examples should not be regarded as limiting what is claimed.

E-1

Poly(styrene)$_p$-poly(acrylate)$_q$ ($R_1$=phenyl, $R_2$=Hydrogen, $R_3$=butyl acrylate), with the following composition 30 g of monomer A and 70 g of monomer B, with 8% of transfer agent: viscous semisolid; I.R. ν cm$^{-1}$: 3082.7, 3060.3, 3026.5, 2926.3, 2854.5, 1943.5, 1870.6, 1801.7, 1729.9, 1601.6, 1493.4, 1452.6, 1355.4, 1252.3, 1160, 1068.2, 1029.08, 944.4, 841.3, 759.6, 699.6, 543.8; $^{13}$C RMN (CDCl$_3$): 170.5, 145.4, 128.1, 127.8, 125.8, 70.6, 40.5, 32.0, 29.7, 28.9, 22.8, 21.0, 14.2.

E-2

Poly(acetate)$_u$-poly(acrylate)$_v$ ($R_2$=Hydrogen, $R_3$=butyl acrylate, $R_4$=Hydrogen), with the following composition 30 g of monomer A and 70 g of monomer B, with 8% of transfer agent: viscous semisolid; I.R. ν cm$^{-1}$: 2959.4, 2931.7, 2873.6, 1736.6, 1459.9, 1371.7, 1237.7, 1167.6, 1119.1, 1023.5, 942.9; $^{13}$C RMN (CDCl$_3$): 174.7, 170.3, 70.5, 69.9, 64.6, 62.2, 41.5, 40.4, 39.5, 31.9, 39.65, 29.7, 29.4, 28.9, 22.7, 20.9, 19.2, 14.1, 13.8.

E-3

Poly(styrene)$_m$-poly(acetate)$_n$ ($R_1$=phenyl, $R_2$=Hydrogen, $R_4$=Hydrogen), with the following composition 30 g of monomer A and 70 g of monomer B, with 2% of transfer agent: viscous semisolid; I.R. ν cm$^{-1}$: 3445.7, 3081.8, 3059.5, 3025.5, 2923.6, 2851.5, 1943.8, 1870.5, 1803.3, 1736.2, 1601.1, 1492.8, 1452.0, 1372.2, 1244.8, 1118.5, 1028.2, 757.4, 698.6, 540.2; $^{13}$C RMN (CDCl$_3$): 145.3, 128.0, 125.7, 70.6, 44.0, 40.6.

E-4

Poly(styrene)$_m$-poly(acetate)$_n$ ($R_1$=phenyl, $R_2$=Hydrogen, $R_4$=Hydrogen), with the following composition 30 g of monomer A and 70 g of monomer B, with 8% of transfer agent: viscous semisolid; I.R. ν cm$^{-1}$: 3059.7, 3025.5, 2923.8, 2852.3, 1943.4, 1871.6, 1738.2, 1601.1, 1492.8, 1452.1, 1372.8, 1243.1, 1108.7, 1027.9, 757.2, 698.9, 540.3; $^{13}$C RMN (CDCl$_3$): 170.5, 145.4, 128.1, 127.8, 125.6, 70.6, 40.6, 31.9, 29.6, 22.8, 21.0, 14.2.

E-5

Poly(styrene)$_m$-poly(acetate)$_n$ ($R_1$=phenyl, $R_2$=Hydrogen, $R_4$=Hydrogen), with the following composition 70 g of monomer A and 30 g of monomer B, with 0% of transfer agent: Solid; I.R. ν cm$^{-1}$: 3453.6, 3025.4, 2922.8, 1943.9, 1870.8, 1732.2, 1601.4, 1493.3, 1452.7, 1373.4, 1242.9, 1119.8, 1025.9, 946.2, 757.6, 698.5, 539.4; $^{13}$C RMN (CDCl$_3$): 170.4, 145.4, 128.0, 125.7, 70.6, 69.7, 67.1, 40.6, 39.3, 21.1.

E-6

Poly(styrene)$_x$-poly(acetate)$_y$-poly(acrylate)$_z$ ($R_1$=phenyl, $R_2$=Hydrogen, $R_3$=C$_4$H$_9$, $R_4$=Hydrogen), with the following composition 30 g of monomer A, 20 g of monomer B and 50 g of monomer C, with 8% of transfer agent: viscous semisolid; I.R. ν cm$^{-1}$: 2958.1, 2929.9, 2872.9, 1731.2, 1453.5, 1372.3, 1238.8, 1163.3, 1066.6, 1028.6, 700.8; $^{13}$C RMN (CDCl$_3$): 175.3, 128.4, 127.8, 126.4, 70.5, 69.8, 64.3, 41.7, 41.2, 39.5, 31.9, 30.7, 29.7, 29.4, 28.9, 22.7, 21.0, 19.2, 13.8.

E-7

Poly(styrene)$_x$-poly(acetate)$_y$-poly(acrylate)$_z$ ($R_1$=phenyl, $R_2$=Hydrogen, $R_3$=tert-butyl, $R_4$=hydrogen): with the following composition 30 g of monomer A, 50 g of monomer B and 20 g of monomer C, with 8% of transfer agent: viscous semisolid; I.R. ν cm$^{-1}$: 3026.4, 2926.3, 1731.6, 1493.4, 1372.0, 1452.6, 1242.1, 1161.0, 1028.4, 759.7, 699.8; $^{13}$C RMN (CDCl$_3$): 175.9, 170.5, 145.2, 143.8, 128.3, 113.9, 70.5, 63.8, 43.1, 1.2, 39.2, 33.8, 32.0, 29.7, 22.8, 21.1, 19.2, 14.2, 13.8.

E-8

Poly(styrene)$_x$-poly(acetate)$_y$-poly(acrylate)$_z$ ($R_1$=C$_6$H$_4$CH$_3$, $R_2$=hydrogen, $R_4$=hydrogen, $R_5$=C$_4$H$_9$): with the following composition 30 g of monomer A, 50 g of monomer B and 20 g of monomer C, with 0% of transfer; viscous semisolid; I.R. ν cm$^{-1}$: 3438.5, 3059.9, 3026.9, 2925.8, 1945.8, 1873.8, 1803.1, 1729.5, 1602.1, 1492.5, 1451.1, 1356.4, 1249.7, 1156.9, 944.6, 840.9, 758.5, 700, 541.6; $^{13}$C RMN (CDCl$_3$): 175.8, 170.5, 145.3, 128.1, 127.7, 125.9, 70.6, 63.8, 41.8, 30.6, 21.0, 19.1, 13.8.

E-9

Poly(styrene)$_x$-poly(acetate)$_y$-poly(acrylate)$_z$ ($R_1$=C$_6$H$_4$CH$_3$, $R_2$=hydrogen, $R_3$=C$_4$H$_9$, $R_4$=hydrogen): with the following composition 20 g of monomer A, 50 g of monomer B and 30 g of monomer C, with 8% of transfer agent; viscous semisolid; I.R. ν cm$^{-1}$: 3442.0, 3082.9, 3026.7, 2928.6, 1944.4, 1870.9, 1731.5 16017, 1493.7, 1453.0, 1373.0, 1242.0, 1160.7, 1028.0, 943.9, 841.3, 759.9, 841.3, 759.9, 699.0, 544.7; $^{13}$C RMN (CDCl$_3$): 175.2, 128.4, 64.2, 41.3, 34.8, 31.9, 30.7, 29.7, 28.9, 22.7, 21.1, 19.2, 13.8.

E-10

Poly(styrene)$_x$-poly(acetate)$_y$-poly(acrylate)$_z$ ($R_1$=C$_6$H$_5$, $R_2$=hydrogen, $R_3$=C$_6$H$_{13}$, $R_4$=hydrogen), with the following composition 20 g of monomer A, 50 g of monomer B and 30 g of monomer C, with 1% of transfer agent; viscous semisolid; I.R. ν cm$^{-1}$: 3437.9, 3026.5, 2926.6, 1944.7, 1873.3, 1728.5, 1601.6, 1493.0, 1451.5, 1354.8, 1250.3, 1155.4, 1028.3, 759.3, 699.3; $^{13}$C RMN (CDCl$_3$): 176.0, 170.6, 144.3, 128.3, 125.9, 70.5, 63.9, 41.2, 31.9, 29.7, 28.9, 22.8, 21.1.

E-11

Poly(styrene)$_x$-poly(acetate)$_y$-poly(acrylate)$_z$ ($R_1$=C$_6$H$_4$CH$_3$, $R_2$=hydrogen, $R_3$=C$_2$H$_5$, $R_4$=hydrogen), with the following composition 20 g of monomer A, 70 g of monomer B and 10 g of monomer C, with 8% of transfer agent; viscous semisolid; I.R. ν cm$^{-1}$: 3059.9, 3025.9, 2924.8, 2852.9, 1943.4, 1871.3, 1802.9, 1730.9, 1493.0, 1452.3, 1243.9, 1154.9, 1028.6, 758.0, 699.2, 541.1; $^{13}$C RMN (CDCl$_3$): 175.9, 170.4, 145.3, 128.2, 125.8, 70.6, 63.8, 46.3, 40.6, 32.0, 30.5, 29.7, 29.4, 22.8, 13.8.

E-12

Poly(styrene)$_x$-poly(acetate)$_y$-poly(acrylate)$_z$ ($R_1$=$C_6H_5$, $R_2$=hydrogen, $R_3$=$C_4H_9$, $R_4$=hydrogen), with the following composition 20 g of monomer A, 70 g of monomer B and 10 g of monomer C, with 1% of transfer agent; viscous semisolid; I.R. ν cm$^{-1}$: 3026.3, 2923.6, 1944.5, 1873.0, 1803.8, 1730.3, 1601.6, 1492.2, 1449.6, 1371.2, 1243.4, 1152.7, 1027.7, 945.0, 908.5, 757.1, 700.3, 539.9; $^{13}$C RMN (CDCl$_3$): 145.3, 128.0, 125.7, 70.6, 63.9, 44.3, 41.1, 40.5, 30.6, 19.1, 13.8.

E-13

Poly(styrene)$_x$-poly(acetate)$_y$-poly(acrylate)$_z$ ($R_1$=$C_6H_5$, $R_2$=hydrogen, $R_3$=$C_6H_{13}$, $R_4$=hydrogen), with the following composition 20 g of monomer A, 10 g of monomer B and 70 g of monomer C, with 8% of transfer agent; viscous semisolid; I.R. ν cm$^{-1}$: 3447.2, 2959.4, 2870.5, 1730.9, 1604.2, 1456.5, 1371.6, 1239, 1164.3, 1065.91026.3, 944.6, 840.4, 759.7, 702.0; $^{13}$C RMN (CDCl$_3$): 175.2, 128.4, 64.2, 41.3, 34.8, 31.9, 30.7, 29.7, 28.9, 22.7, 21.1, 19.2, 13.8.

E-14

Poly(styrene)$_x$-poly(acetate)$_y$-poly(acrylate)$_z$ ($R_1$=$C_6H_4CH_3$, $R_2$=hydrogen, $R_3$=$C_4H_9$, $R_4$=hydrogen), with the following composition 20 g of monomer A, 10 g of monomer B and 70 g of monomer C, with 1% of transfer agent; viscous semisolid; I.R. ν cm$^{-1}$: 3446.2, 2959.0, 2873.5, 1732.2, 1453.0, 1372.9, 1239.5, 1163.8, 1117.9, 1066.3, 1024.2, 943.9, 701.6; $^{13}$C RMN (CDCl$_3$): 175.0, 170.2, 0.5, 64.6, 41.4, 39.1, 35.3, 30.7, 20.9, 19.2, 13.8.

E-15

Poly(styrene)$_x$-poly(acetate)$_y$-poly(acrylate)$_z$ ($R_1$=$C_6H_5$, $R_2$=hydrogen, $R_3$=$C_6H_{13}$, $R_4$=hydrogen), with the following composition 60 g of monomer A, 30 g of monomer B and 10 g of monomer C, with 8% of transfer agent; viscous semisolid; I.R. ν cm$^{-1}$: 3026.6, 2925.9, 2854.3, 1732.9, 1601.6, 1492.8, 1451.4, 1372.2, 1241.3, 1156.9, 1026.6, 945.7, 758.2, 700.5; $^{13}$C RMN (CDCl$_3$): 170.5, 128.3, 70.5, 41.2, 39.3, 31.9, 29.4, 22.8, 14.2, 13.8.

E-16

Poly(styrene)$_x$-poly(acetate)$_y$-poly(acrylate)$_z$ ($R_1$=$C_6H_5$, $R_2$=hydrogen, $R_3$=$C_4H_9$, $R_4$=hydrogen), with the following composition 60 g of monomer A, 30 g of monomer B and 10 g of monomer C, with 1% of transfer agent; viscous semisolid; I.R. ν cm$^{-1}$: 3442.9, 3026.0, 2921.8, 1944.4.

The random polymers (copolymers and terpolymers) of the present invention were formulated using various solvents and assessed as flow improvers, either reducing the viscosity and/or reducing the pour point in Mexican crude oils whose API gravity is between 9 to 30, the following results are illustrative way do not mean any limitation.

Formulations of Copolymers and their Assessment as Pour Point Reducing Agents for Light and Medium Crude Oils Different concentrated solutions of alternating copolymers of 1 to 60% by weight, preferably 5 to 40% by weight, were prepared using solvents whose boiling point falls within the range of 35 to 200° C., preferably xylene, toluene, benzene, methyl ethyl ketone, kerosene, turbosine, naphtha, individually or in mixtures, so added small volumes of dissolution and avoided the effect of the solvent influenced in the evaluation of the pour point. Alternating copolymers were evaluated in concentrations in the range of 100 to 4,000 ppm.

Light crude oil used in the present invention was characterized as shown below in Table 3.

TABLE 3

Physicochemical and physical characterization of light, medium and heavy crude oils (Castro L V et al, 2009).

| Parameter | Light | Medium | Heavy |
|---|---|---|---|
| API density | 29.6 | 21.3 | 15.8 |
| Salt content | 23.0 kg/1,000 bls | 1090 kg/1,000 bls | 1.1 kg/1,000 bls |
| Wax content (wt %) | 3.02 | 3.83 | 4.27 |
| Water by distillation (vol %) | 0.8 | 1.8 | 0.10 |
| Pour Point (° C.) | −21 | −24 | −2 |
| SARA Analysis (wt %) | | | |
| Saturates | 38.44 | 26.53 | 10.49 |
| Aromatics | 14.59 | 14.74 | 9.0 |
| Resins | 41.44 | 47.60 | 64.12 |
| Asphaltenes | 5.53 | 11.13 | 16.39 |

The copolymers were evaluated simultaneously with commercial copolymers type EVA (ethylene-vinyl acetate), as reducing agents of the pour point and as a reference.

The assessment procedure is described below: the sealed bottles with insert number and lid is indicated by the number of compounds to assess plus one that corresponds to the crude oil without additives; each of them was added with crude oil to the 80 mL mark. All the bottles were placed in a water bath at a controlled temperature in 60° C. for 30 minutes, at the end of that time was added above the aliquot of the dissolution alternating copolymers and the commercial copolymers formulations; all the bottles shook for 4 minutes at a rate of 2 beats per second and later placed for 20 minutes in ultrasonic bath with controlled temperature of 60° C. After agitation, the test pieces were placed according to the method ASTM D-97 and left at least 22 hours at room temperature, the evaluation was the performed. All the copolymers, the reason of this invention, and commercial formulations were assessed at different concentrations in the range from 200 to 4,000 ppm. As reference was also prepared a sample of crude oil only with the solvent (without polymer addition) and which is referred to as untreated.

Figure 2:
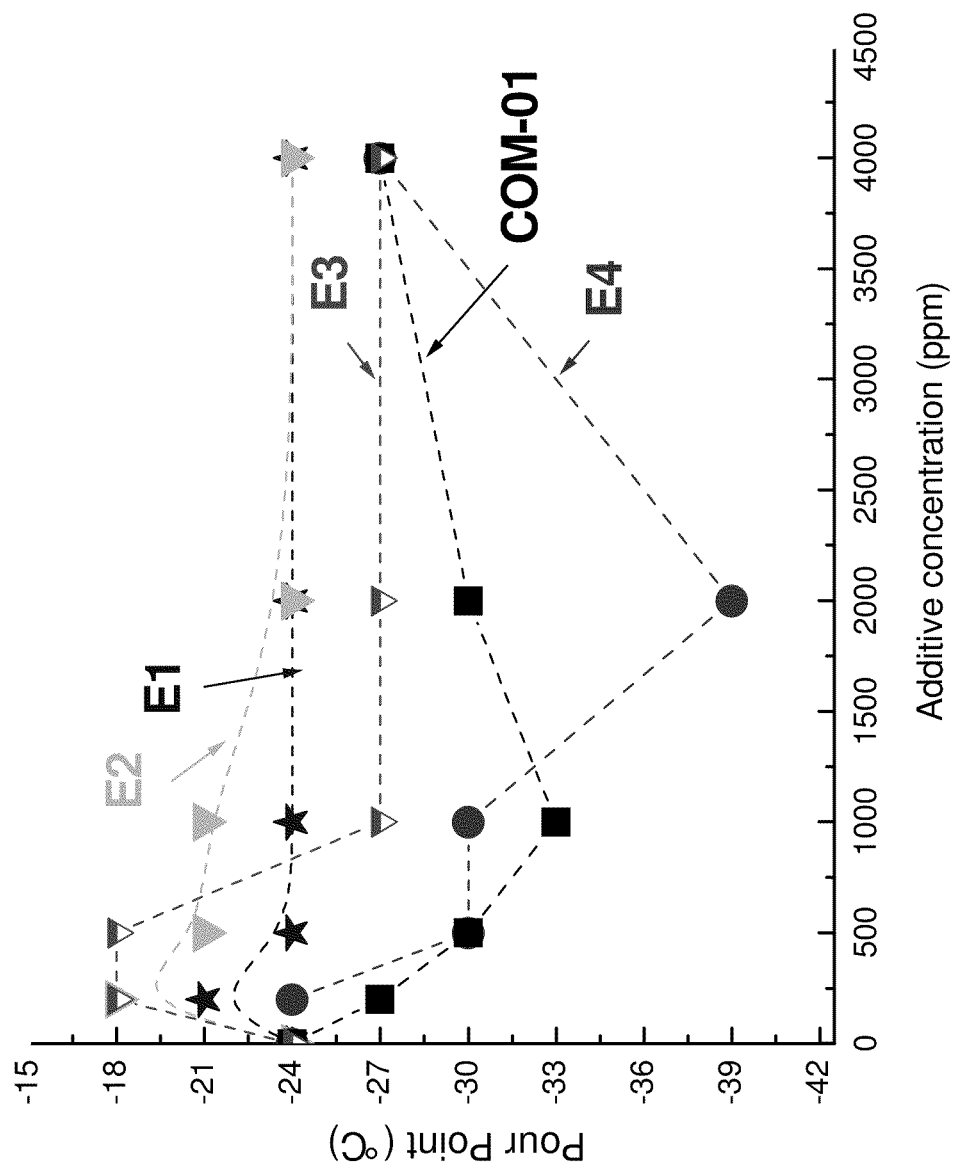
FIG. 2 shows the effect of the pour point decrease activity in middle crude oils, evaluated from 250 to 4,000 ppm.

As a demonstration, which does not involve limitation, results are displayed, in FIGS. 1 and 2, the evaluation of copolymers of examples 1-4, for a concentration range of 200 and 4,000 ppm, crude light and medium respectively; commercial formulations are follows:

COM-01: {copolymer of ethylene and 75/25, vinyl acetate MN=38678 Daltons (20%) with solvent (80%).}

COM-02: {ethylene and vinyl 60/40 (p./p.), MN acetate copolymers=52383 Daltons (20%) with solvent (80%).}

FIG. 1 presents the outcome of examples E1-E4 as pour point depressants in light crude. Example 4 is the only one that reduces in greater proportion the pour point, corresponding to the example that has lower molecular weight number. The pour point is significantly reduced in dosages for example 4 and COM-1 between 500 and 2,000 ppm regarding oil without adding with copolymers (untreated).

E1 and E2 examples do not have an effect as pour point depressants. This can be explained by the lack of interaction between acrylates units of copolymers with components of crude oil, especially with waxes, while styrene-vinyl copolymers have better affinity with crude oil.

FIG. 2 presents the results of examples E1-E4 as pour point depressants in medium crude oil. The example E4 showed the best performance to be evaluated in medium crude oil, which contains more aromatic components and more content of asphaltenes compared to the light crude oil.

The effect of molecular mass in examples 3 and 4 is present to compare results in FIG. 2, this last being the most satisfactory.

The copolymer COM-1 presents some reduction at the pour point in medium crude oil, but not in the same way did it with light crude oil. This difference in behavior can be attributed to the increase of asphaltenes in the medium crude oil (11.13% by weight), as well as the increase in molecular mass of these.

Random Terpolymers Formulation and their Evaluation as Viscosity Reducing Agents in Heavy Crude Oil.

Tests consisted in the realization of temperature sweeps to determine the behavior of the viscosity of the heavy crude with added random polymers, depending on temperature; all crude oil samples were subjected to a constant shear rate of $\gamma=50$ sec$^{-1}$, in a temperature range of 20 to 80° C.

Prepared different concentrated solutions of each of the random terpolymers at 5 to 40% by weight, using solvents whose boiling point falls within the range of 35-200° C., preferably xylene, toluene, benzene, methyl ethyl ketone, kerosene, turbosine, naphtha, individually or in mixtures, so added small volumes of dissolution and found that the effect of the solvent did not influence the assessment of viscosity. Random terpolymers were evaluated simultaneously with commercial type EVA copolymers (vinyl, with 25% and 40% ethylene-acetate copolymers weight of vinyl acetate), as reducing agents of viscosity in concentrations in the range of 250 to 4,000 ppm. The characterization of heavy crude oil used in this evaluation is indicated in Table 3.

The assessment procedure described below: the sealed bottles with insert number and lid is indicated by the number of compounds to assess plus one that corresponds to the crude without additives; each of them added crude oil to the 80 mL mark. All the bottles were placed in a water bath at a controlled temperature in 40 ° C. for 15 minutes, at the end of that time was added above the aliquot of the dissolution of the random terpolymers and the commercial copolymers formulations; all the bottles shook during 4 minutes, 2 beats per second and later 20 minutes in ultrasonic bath with controlled temperature of 60° C. After agitated remained at rest at room temperature, then perform the evaluation. All the terpolymers reason for this invention and commercial formulations were assessed at different concentrations in the ranger of 250 to 1,000 ppm for a solution to 20% of polymer in any solvents or mixtures of them mentioned above although preferably used xylene or toluene. Crude oil samples without polymer were used as untreated or reference.

An important parameter to reduce the viscosity of crude oil and improve fluidity is the manipulation of temperature. The temperature strongly influences the viscosity of high molecular mass of crude oil components. Increasing temperature increases the level of clutter the structures of the components of crude oil, resulting in reduce the viscosity drastically (Borthakur a. et al, 1996).

Heavy oil samples were performed rotational testing at different temperatures which provide information about the flow material properties and its behavior respect to temperature.

For this part of the evaluation it was used a rheometer to study the influence of the terpolymers on the behavior of heavy oil with temperature and rotational tests. The influence of polymers was evaluated at concentrations preferably from 250 to 10,000 ppm (Nuñez S M et al 2001, Ronningsen H P et al 1991).

It was used a rheometer (Anton Parr) Physica MCR301 model. It was performed the measurement of viscosity at 20° C. using a cutting speed range of 0.1 to 300 sec$^{-1}$, with these measurements was made graphic representation of the coefficient of viscosity $\eta$ depending on cutting speed $\gamma$, called viscosity curve $\eta=f(\gamma)$, similarly the measurement was made of shear $\tau$ depending on cutting speed $\gamma$ (Nuñez S M et al 2001, Bharambe D P et al 2006).

Figure 3:
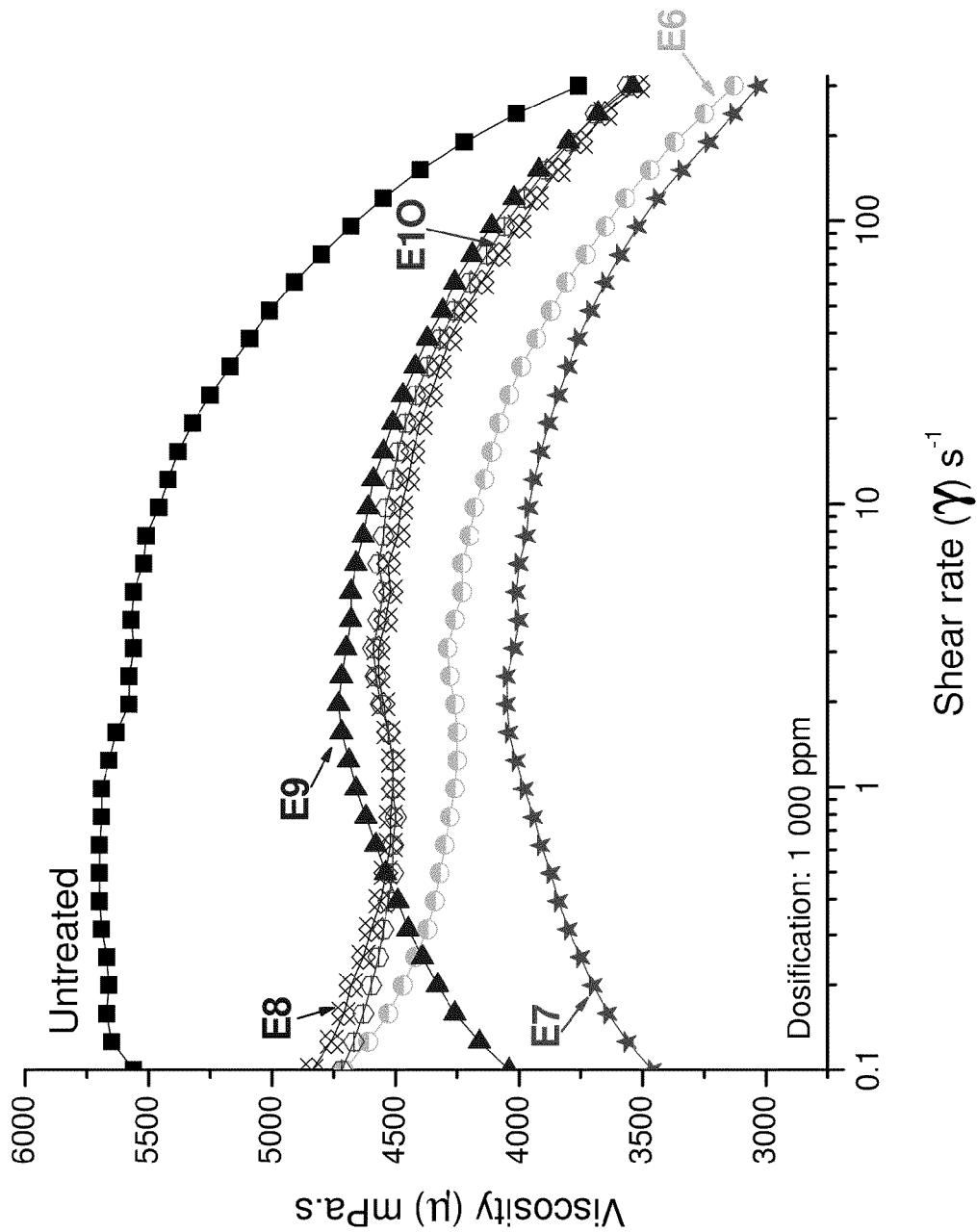
FIG. 3 exhibits the effect of the reducing viscosity activity at 20° C. in heavy crude oil in examples 6, 7, 8, 9 and 10, evaluated at 1,000 ppm.

By way of demonstration, which does not imply any limitation, are shown in FIGS. 3, 4, 5 and 6, the results of the evaluation described above, dosing at 500 and 1,000 ppm of a 20% solution of polymer at a temperature of 20° C. (Torres E et al 2004, Ahlers W et al 2007):

FIG. 3 in the top, shows the evolution of the viscosity of heavy oil without an additive (white) versus the cutting speed. It is also clear that all the tested terpolymers (E6-E10) reduced the oil viscosity along the selected shear rate range, from 0.1 to 300 s$^{-1}$, at a constant temperature of 20° C.

The terpolymer which exhibits the best performance is the P(BuA-co-AV-co-S) 20/30/50 (E7), that has a low molecular weight ($\overline{M}_w$=3705 Daltons). Compositionally speaking is the one with greater styrene content, less composition of acetates and median acrylate groups.

Figure 4:
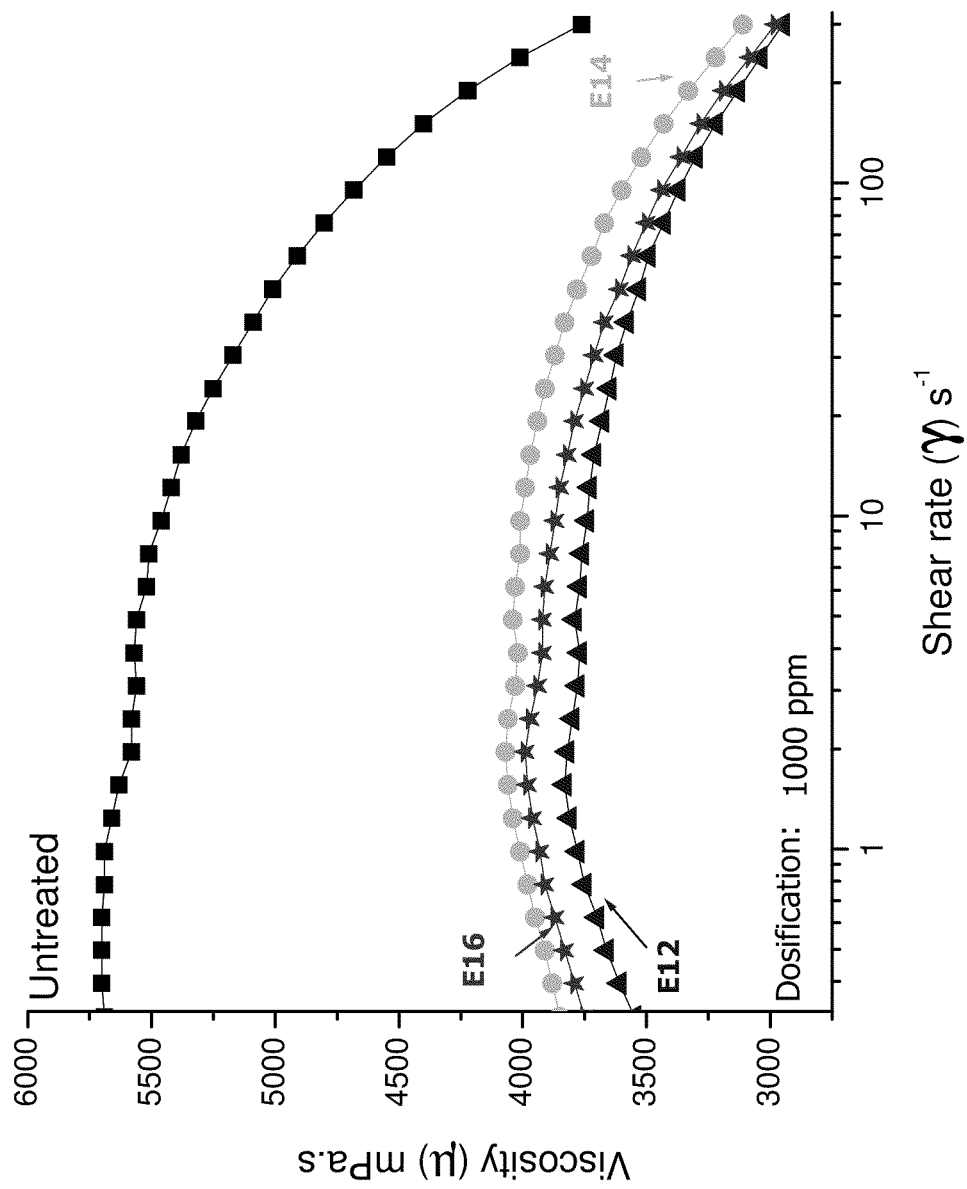
FIG. 4 presents the effect of the viscosity decrease activity at 20° C. in heavy crude oil of examples 11, 14 and 16 evaluated at 1,000 ppm.

In order to compare the terpolymers with the best viscosity reducing effect, reference is made to FIG. 4, where evaluations of heavy crude oil without an additive (white) and with terpolymers E12, E14 and E16 additives are reported, all of them of high molecular weight. The order of reduction of viscosity is E12>E16>E14. The above results clearly demonstrate the magnitude of the molecular mass number ($\overline{M}_w$) that must have the terpolymer. For a terpolymer is a good viscosity reducer it appears that must have a high composition of styrenic polymers, considerable composition of acrylate groups and low composition of acetate groups.

Figure 5:
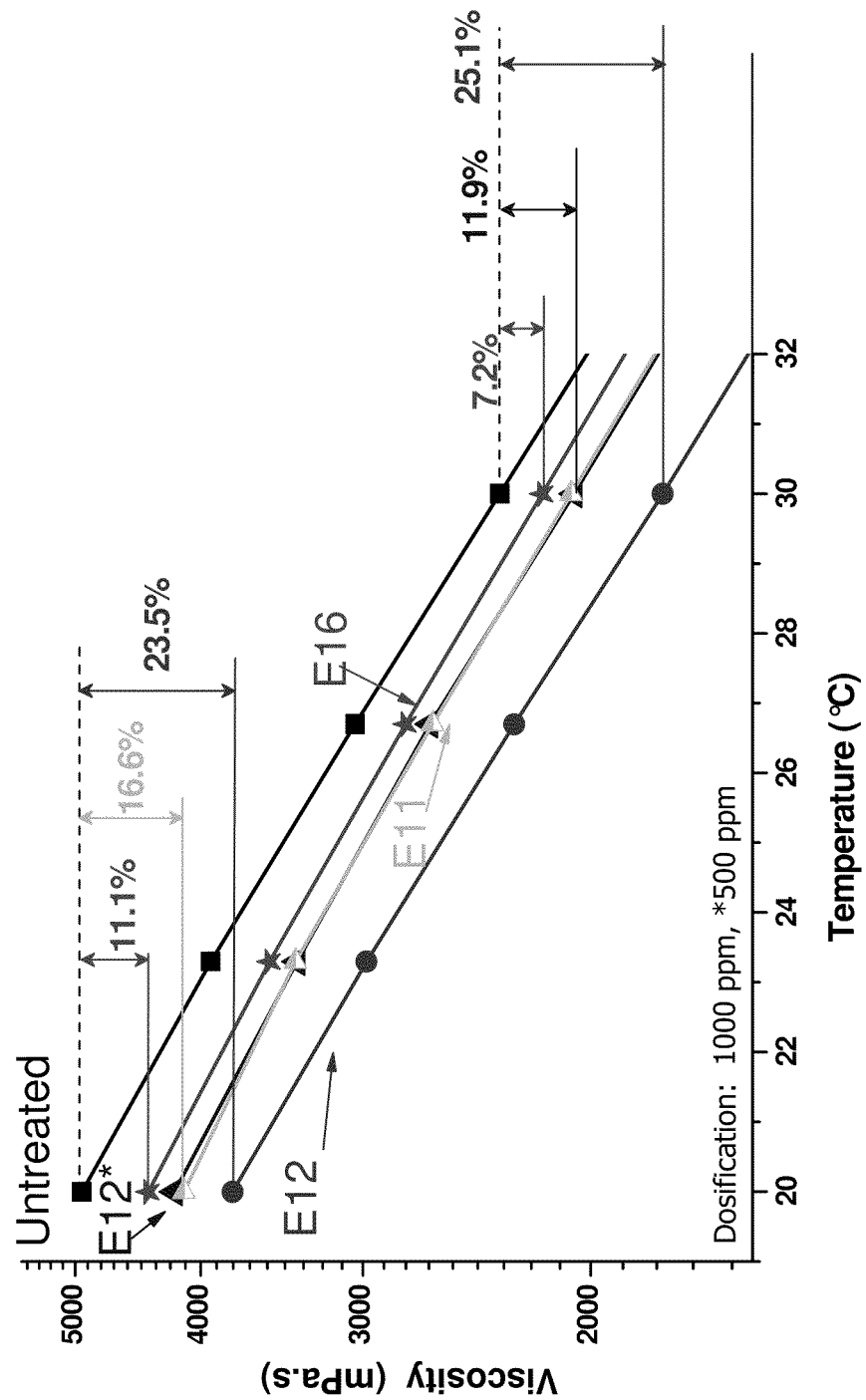
FIG. 5 exposes the effect of the viscosity decrease activity in heavy crude oil at different temperatures of examples 11, 12 and 16 evaluated at 500 and 1,000 ppm.

FIG. 5 shows the viscosity curve of heavy crude with polymers E11, E12 and E16, at temperatures from 20 to 32° C. and dosages of 1,000 ppm, and is observed that the sample of heavy oil with additive E12 presents an initial reduction of 23.5%, and as the temperature increases to 30° C., reduced viscosity is about 25.1%. In the same Figure, a way of comparison were included the results of percentage reduction of E16 and E11.

Figure 6:
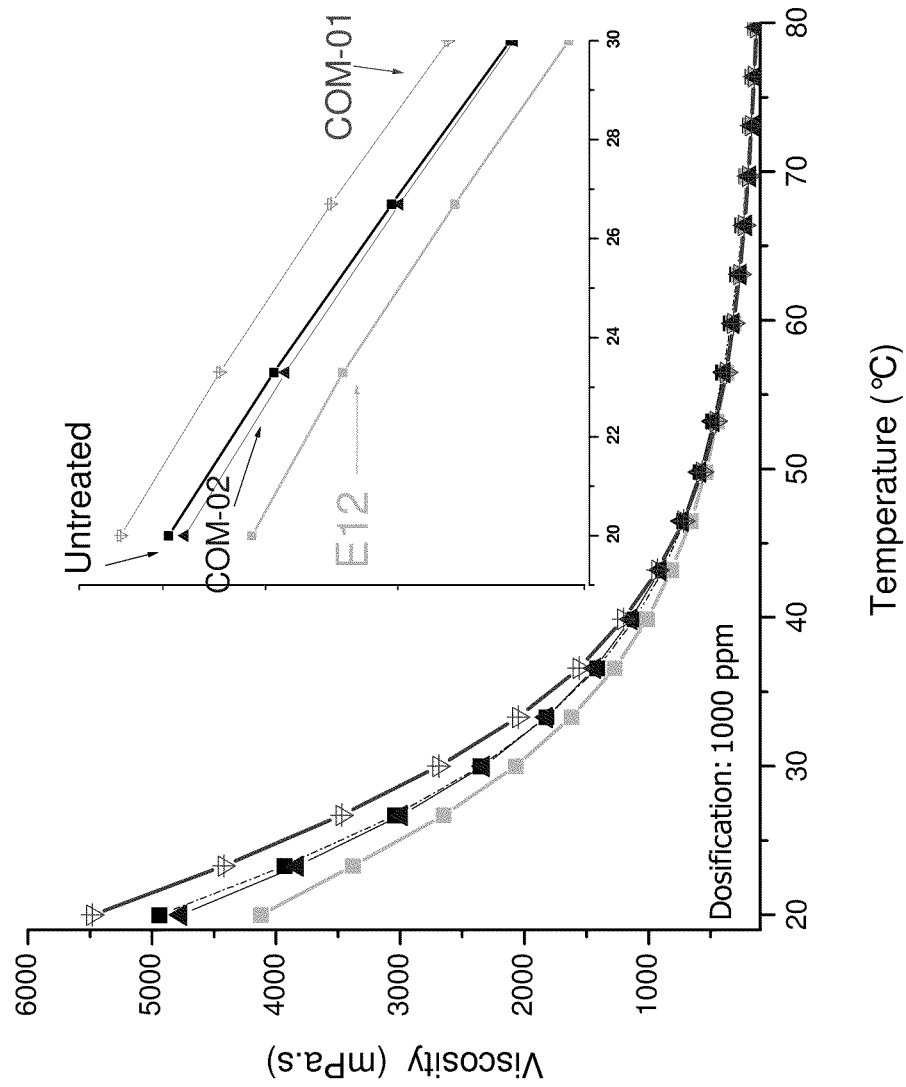
FIG. 6 shows the effect of the decrease activity of the activity in heavy crude oil at different temperatures of examples 12, COM-01 and COM-02, evaluated at 1,000 ppm.

FIG. 6 shows the general behavior of heavy oil without an additive (untreated) and with different concentrations of polymer additives, and that is where it can ratify the behavior of viscosity reduction with increasing temperature on added oil. It is necessary to highlight the fact that at low temperatures (from 20 to 40° C.) the viscosity of heavy oil is reduced and at temperatures above 50° C. is noted that oil is no longer sensitive to these polymers.

However, it is important to note that the main interest of this invention is focused on reducing the viscosity of heavy oil in the temperature range of 20 to 30° C., since this range represents the normal operating conditions at platforms and refineries.

The same Figure presents the results of the evaluation of two commercial copolymers (COM-01 and COM-02) as viscosity reducers. Neither reduces the viscosity of heavy crude. One of them has any influence even as viscosity reducer (COM-02). Even worse, the commercial copolymer (COM- 01) increases the viscosity; in contrast, the random terpolymer E-12 significantly reduces the viscosity of heavy oil.

With the different sets of tests using synthesized terpolymer and copolymers and added to different types of Mexican crude, it was possible to identify both the effect that caused each of the monomers and the effective polymer molecular mass range ($\overline{M}_w$). Also, it was possible to establish to the characterization tests should have been submitted crude oil, if it wanted to evaluate the pour point or viscosity reduction.

For Mexican crudes, commercial copolymer COM-01 is a good pour point depressant but not so good viscosity reducer. When there are significant amounts of asphaltenes in crude oils, the rheological behavior of the structure of the copolymer COM-1 is considerably reduced (Castro M F et al, 2008). In contrast, E4 and E12 polymers proved to be good pour point depressants and viscosity reducers under conditions of processing various crudes oil used into platforms and refineries.

What is claimed is:

1. A random polymer formulation, wherein the random copolymers have the following formula:

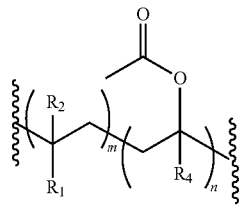

where:
$R_1$, $R_2$ and $R_4$ are represented by independent radical groups listed below:
$R_1=C_6H_5$, $CH_3C_6H_4$, $(CH_3)_2C_6H_3$, $(CH_3)_3C_6H_2$, $(CH_3)_3CC_6H_4$;
$R_2=H$, CH3;
$R_4=H$, CN;
m=from 10 to 700;
n=from 1 to 220.

2. A random polymer formulation according to claim 1, wherein m is from 20 to 650 and n is from 10 to 200.

3. A random polymer formulation according to claim 2, wherein m is from 40 to 620 and n is from 20 to 170.

4. A random polymer formulation according to claim 1, wherein said random polymer formulation comprises a mixture of copolymers having molecular weights in number ranging between 2,000 to 90,000 Daltons.

5. A random polymer formulation according to claim 4, wherein said molecular weights range in number between 5,000 and 80,000 Daltons.

6. A random polymer formulation, wherein said random polymer formulation comprises random copolymers having the formula:

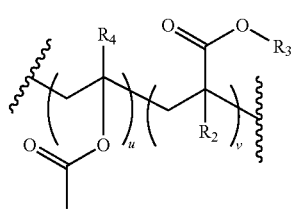

where:
$R_2$, $R_3$ and $R_4$ are represented by independent radical groups listed below:
$R_2=H$, $CH_3$;
$R_3=CH_3$, $C_2H_5$, $C_4H_9$, $C_6H_{13}$, $C_8H_{17}$, $C_{10}H_{21}$, $C_{12}H_{25}$, $C_{18}H_{37}$;
$R_4=H$, CN;
u=from 1 to 220;
v=from 1 to 50.

7. A random polymer formulation according to claim 6, wherein u is from 10 to 200 and v is from 10 to 40.

8. A random polymer formulation according to claim 6, wherein u is from 30 to 170 and v is from 15 to 30.

9. A random polymer formulation according to claim 6, wherein said random polymer formulation comprises a mixture of copolymers having molecular weights ranging between 2,000 to 90,000 Daltons.

10. A random polymer formulation according to claim 9, wherein said molecular weights range between 5,000 and 80,000 Daltons.

11. A random polymer formulation, wherein said random polymer formulation comprises a random terpolymer having the formula:

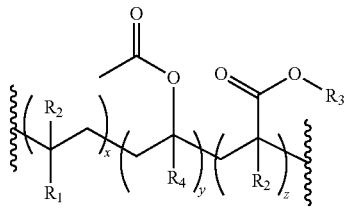

where:
$R_1$, $R_2$, $R_3$ and $R_4$ are represented by independent radical groups listed below:
$R_1=C_6H_5$, $CH_3C_6H_4$, $(CH_3)_2C_6H_3$, $(CH_3)_3C_6H_2$, $(CH_3)_3CC_6H_4$;
$R_2=H$, $CH_3$;
$R_3=CH_3$, $C_2H_5$, $C_4H_9$, $C_6H_{13}$, $C_8H_{17}$, $C_{10}H_{21}$, $C_{12}H_{25}$, $C_{18}H_{37}$;
$R_4=H$, CN;
x=from 2 to 900;
Z=from 1 to 300;
y=from 1 to 226.

12. A random polymer formulation according to claim 11, wherein x is from 20 to 850, z is from 10 to 235 and y is from 10 to 210.

13. A random polymer formulation according to claim 11, wherein x is from 25 to 700, z is from 20 to 220 and y is from 20 to 200.

14. A set of terpolymers according to claim 5, wherein the molecular weights are in number range from 1,000 to 140,000 Daltons.

15. A set of terpolymers according to claim 14, wherein the molecular weights are in number range 2,000 to 100,000 Daltons.

16. A process of reducing the viscosity and depressing the pour point of crude oil, the process comprising:
mixing the crude oil with the random polymer of claim 1 in an amount effective to reduce the viscosity and depress the pour point of the crude oil.

17. A process of claim 16, wherein the crude oil has an API gravity of 9 to 30° API.

18. A composition comprising crude oil having an API gravity of between 9 and 30° and the random polymer formulation of claim 1, wherein said random polymer formulation is present in an amount sufficient to reduce the viscosity and depress the pour point of the crude oil.

19. A process of reducing the viscosity and depressing the pour point of crude oil having an API gravity between 9 and 30°, comprising the step of adding at least one random polymer to said crude oil, where said at least one random polymer is selected from the group consisting of

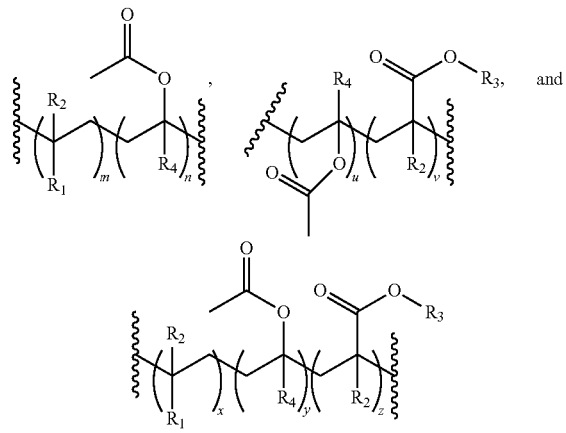

where:
$R_1$, $R_2$ and $R_4$ are represented by independent radical groups listed below:
$R_1 = C_6H_5$, $CH_3C_6H_4$, $(CH_3)_2C_6H_3$, $(CH_3)_3C_6H_2$, $(CH_3)_3CC_6H_4$;
$R_2 = H$, CH3;
$R_3 = CH_3$, $C_2H_5$, $C_4H_9$, $C_6H_{13}$, $C_8H_{17}$, $C_{10}H_{21}$, $C_{12}H_{25}$, $C_{18}H_{37}$;
$R_4 = H$, CN;
m=from 10 to 700;
n=from 1 to 220
u=from 1 to 220;
v=from 1 to 50;
x=from 2 to 900;
y=from 1 to 226;
z=from 1 to 300;

wherein said random polymer is present in an amount to reduce the viscosity and depress the pour point of said crude oil.

20. The process of claim 19, wherein said at least one random polymer is added in an amount of 250 to 4,000 ppm based on the amount of the crude oil.

21. The process of claim 20, further comprising the step of adding a mixture of the random polymers to the crude oil.

22. The process of claim 21, wherein said random polymer is a random polystyrene-polyacrylate polymer.

23. The process of claim 21, wherein said random polymer is a random polyacetate-polyacrylate polymer.

24. The process of claim 21, wherein said random polymer is a random polystyrene-polyacetate polymer.

25. The process of claim 21, wherein said random polymer is a random polystyrene-polyacetate-polyacrylate terpolymer.

26. A random polymer formulation for improving the flow of crude oil having an API gravity between 9 and 30°, which depresses the pour point and/or reduces the viscosity, comprising a random polymer of claim 1 at a concentration ranging from 1 to 60% by weight, and a solvent having a boiling point in the range of 35 to 200° C.

27. A random polymer formulation according to claim 1, wherein said solvent is a member selected from the group consisting of dichloromethane, chloroform, benzene, toluene, xylenes, jet fuel, naphtha, individually and mixtures thereof.

28. A random polymer formulation according to claim 11, wherein the random polymer formulation comprises a mixture of random copolymers or terpolymers.

29. A process of reducing the viscosity and depressing the pour point of crude oil, the process comprising:
mixing the crude oil with the random terpolymer of claim 11 in an amount effective to reduce the viscosity and depress the pour point of the crude oil.

30. The process of claim 29, further comprising the step of adding a mixture of the random terpolymers to the crude oil, in an amount of 250 to 4,000 ppm based on the amount of the crude oil.

31. A composition comprising crude oil having an API gravity of between 9 and 30° and the random terpolymer formulation of claim 11, wherein said random terpolymer formulation is present in an amount sufficient to reduce the viscosity and depress the pour point of the crude oil.

* * * * *